United States Patent
Merk

(10) Patent No.: US 12,422,345 B2
(45) Date of Patent: Sep. 23, 2025

(54) DROP-WEIGHT IMPACT DAMAGE INFLICTION FOR A SURFACE OR COMPONENT UNDER TEST

(71) Applicant: Gulfstream Aerospace Corporation, Savannah, GA (US)

(72) Inventor: Andrew Merk, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 309 days.

(21) Appl. No.: 18/346,687

(22) Filed: Jul. 3, 2023

(65) Prior Publication Data

US 2025/0012690 A1    Jan. 9, 2025

(51) Int. Cl.
G01N 3/303    (2006.01)

(52) U.S. Cl.
CPC ..... *G01N 3/303* (2013.01); *G01N 2203/0033* (2013.01); *G01N 2203/0039* (2013.01)

(58) Field of Classification Search
CPC .......... G01N 3/303; G01N 2203/0033; G01N 2203/0039; G01N 3/30; G01N 3/42
See application file for complete search history.

(56) References Cited

U.S. PATENT DOCUMENTS

| | | | |
|---|---|---|---|
| 720,575 A * | 2/1903 | Fremont | G01N 3/303 73/862.53 |
| 2,109,521 A * | 3/1938 | Ballentine | G01N 3/42 73/82 |
| 2,258,424 A * | 10/1941 | Smith | G01N 3/42 73/83 |
| 3,956,925 A * | 5/1976 | Smith | G01N 3/42 73/81 |
| 5,457,984 A * | 10/1995 | Ambur | G01N 3/303 73/12.09 |
| 6,286,613 B1 * | 9/2001 | Tsai | G01N 3/303 175/135 |
| 2007/0248807 A1 * | 10/2007 | Kaschak | C04B 35/83 428/312.2 |
| 2011/0226046 A1 * | 9/2011 | Giardino | G01N 11/10 73/85 |
| 2014/0256479 A1 * | 9/2014 | Bynum, Jr. | F41J 3/0033 473/470 |
| 2017/0176308 A1 * | 6/2017 | Koning | G01M 7/08 |
| 2019/0320941 A1 * | 10/2019 | Yang | A61B 5/1036 |

* cited by examiner

*Primary Examiner* — David J Bolduc
(74) *Attorney, Agent, or Firm* — Ingrassia Fisher & Lorenz, LLP

(57) ABSTRACT

A system and related methodology for inflicting structural impact damage to an article are disclosed. Certain embodiments of the system include: a main support body; a guide tube having a lower end region couplable to the main support body, and having a hollow interior passageway; an adjustable weight assembly receivable and moveable within the hollow interior passageway; an impact tip receivable within an opening formed in a lower end section of the main support body, the impact tip movable within the opening such that an exposed length of the impact tip protrudes outside of the main support body; and a travel-limiting assembly associated with the impact tip. The travel-limiting assembly is adjustable to define a variable maximum penetration depth of the impact tip relative to the article.

19 Claims, 12 Drawing Sheets

DROP-WEIGHT IMPACT DAMAGE INFLICTION FOR A SURFACE OR COMPONENT UNDER TEST

TECHNICAL FIELD

Embodiments of the subject matter described herein relate generally to structural testing procedures and related test equipment. More particularly, embodiments of the subject matter relate to a structural testing procedure for inflicting impact damage to a surface or component under test.

BACKGROUND

Structural testing of materials and components is required in many industries, such as aircraft manufacturing, automobile manufacturing, and the like. One type of structural test involves the infliction of damage to a surface or component under test, such that the properties and characteristics of the damaged test article can be determined or observed. In this regard, a test article can be damaged in a controlled manner via impact with another object, e.g., a component of a test fixture or test system. Impact testing of a test article formed of (or including) a composite material may specify a desired depth range for the inflicted impact damage, and may specify a maximum energy that can be applied when creating the impact damage.

To this end, a traditional drop hammer system can be used for a gravity-based impact test system. Testing is performed by a drop hammer system by calibrating the system to find the correct energy (e.g., a combination of weight and drop height) using a calibrating test article and a freefalling weight that causes the desired impact damage depth. Once the appropriate combination of weight and drop height has been determined, the same combination is utilized with the actual test article, in an attempt to recreate the same impact damage depth. Unfortunately, inconsistencies between composite material test articles can lead to deeper or shallower impact damage on the actual test article. Such uncontrolled variations in the impact damage depth are undesirable and should be avoided to the extent possible.

Accordingly, it is desirable to have an improved methodology and testing system that inflict impact damage to a test article in a reliable, accurate, and predictable manner. Furthermore, other desirable features and characteristics will become apparent from the subsequent detailed description and the appended claims, taken in conjunction with the accompanying drawings and the foregoing technical field and background.

BRIEF SUMMARY

A system for inflicting structural impact damage to an article is described here. Embodiments of the system include: a main support body; a guide tube having a lower end region couplable to the main support body, and having a hollow interior passageway; an adjustable weight assembly receivable and moveable within the hollow interior passageway; an impact tip receivable within an opening formed in a lower end section of the main support body, the impact tip movable within the opening such that an exposed length of the impact tip protrudes outside of the main support body; and a travel-limiting assembly associated with the impact tip. The travel-limiting assembly is adjustable to define a variable maximum penetration depth of the impact tip relative to the article.

A method for inflicting structural impact damage to an article is also described here. Embodiments of the method involve: initializing an impact damage infliction test system to obtain a target dent depth in a surface of the article. Certain embodiments of the test system include: means for impacting an impact tip with a specified maximum energy; and means for limiting travel of the impact tip. The means for limiting is adjustable to define a variable maximum penetration depth of the impact tip relative to the surface of the article. The initializing step results in a first maximum penetration depth for the impact tip. The method also involves: operating the means for impacting to apply the specified maximum energy to the impact tip, using the first maximum penetration depth; measuring a resulting dent depth formed in the surface of the article in response to movement of the impact tip caused by operating the means for impacting; comparing the resulting dent depth against the target dent depth; adjusting the means for limiting when the resulting dent depth differs from the target dent depth by at least a specified tolerance value, wherein the adjusting changes the first maximum penetration depth to a second maximum penetration depth; and after adjusting the means for limiting, operating the means for impacting to apply the specified maximum energy to the impact tip, using the second maximum penetration depth.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
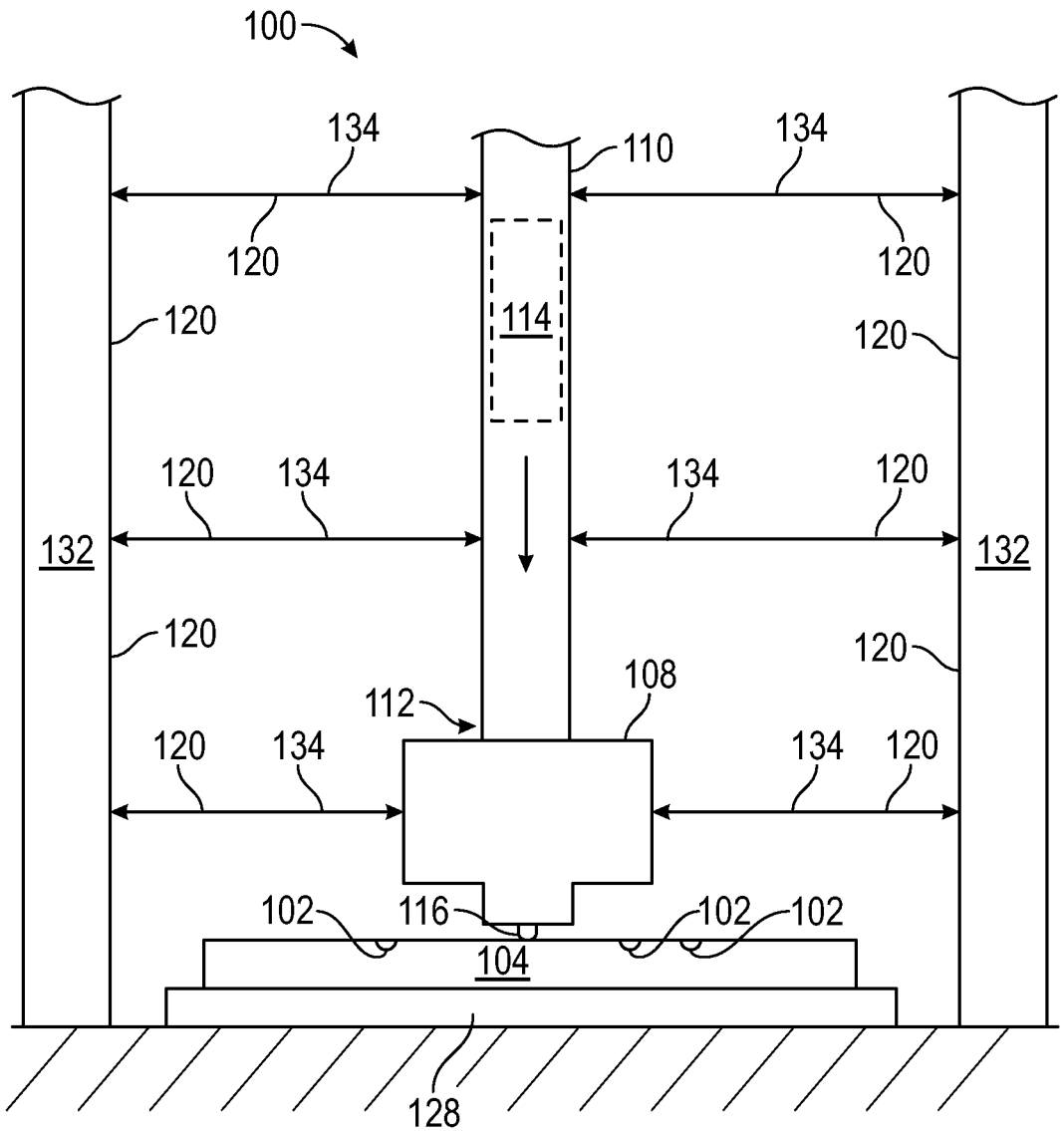
FIG. 1 is a simplified schematic representation of an exemplary embodiment of a system for inflicting structural impact damage to an article.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

This description relates to a procedure and an associated test system for damage infliction using a drop-weight impact method. In this regard, impact damage infliction is a common requirement for composite fatigue and damage tolerance testing of materials and components used in the manufacture of vehicles such as aircraft.

In accordance with a traditional "drop hammer" system, the goal is to determine the impact energy that will create a desired dent depth in the surface of the article under test. Determining the desired impact energy is achieved with a calibration routine that creates impact damage dents in a calibration or test article that is structurally similar to the impact location of the actual article where the calibrated impact dent depth is to be created. The desired impact energy is determined by changing the applied impact energy (which is typically limited by a predetermined maximum energy amount), measuring the resulting dent depths, and identifying the applied impact energy that can repeatably generate the target dent depth. After the calibrated impact energy is determined, a final impact is performed in a location on the calibrating test article that is identical (or substantially similar) to the actual damage location on the official test article. The resulting dent depth is measured to confirm whether or not the calibrated impact energy provides consistent results. After the official test article is setup with the same boundary conditions as the calibrating setup, the official impact damage is inflicted on the designated location using the calibrated impact energy. The routine described above can be performed for each official damage location.

The inventive subject matter presented here represents an improvement on the traditional drop hammer system and procedure for calibrating and creating impact dents having a specified depth. In contrast to the traditional methodology that requires the determination of a specific impact energy, the methodology described below employs a deflection-limited drop hammer system that utilizes a specified maximum impact energy for each impact. The impact infliction system includes an impact tip that is forced against the surface of the article to create the impact damage. The system also includes means for limiting travel of the impact tip, which is adjustable to define a variable maximum penetration depth of the impact tip relative to the surface of the article. By varying the characteristics (setting) of the means for limiting travel, translation of the impact tip caused by application of the maximum impact energy can be controlled to obtain the target dent depth. After the target dent depth is obtained, a final impact is performed in a location on the calibrating test article that is identical (or substantially similar) to the actual damage location on the official test article. The resulting dent depth is measured to confirm whether or not the means for limiting travel is arranged to provide consistent results. After the official test article is setup with the same boundary conditions as the calibrating setup, the official impact damage is inflicted on the designated location using the same system configuration and the specified maximum energy. The routine described above can be performed for each official damage location.

The system described herein creates impact damage without exceeding the specified maximum energy or an experimentally determined dent depth. The deflection-limited drop hammer methodology provides for an impact that meets certain test requirements while increasing accuracy and reducing the risk of unplanned damage to the test article.

Referring to the drawings, FIG. 1 is a simplified schematic representation of an exemplary embodiment of a system 100 for inflicting structural impact damage 102 (e.g., dents, depressions, cracks, blemishes, divots, or the like) to an article 104. During calibration of the system 100, the article 104 may be considered a "test article" or a "calibration article" for purposes of this description. After calibration of the system 100, the article 104 may be considered a "specimen article" to distinguish it from the article or articles that are previously damaged during the calibration routine.

The illustrated embodiment of the system 100 includes, without limitation: a main support body 108; a guide tube 110 having a lower end region 112 that is couplable to the main support body 108; an adjustable weight assembly 114 that is receivable and moveable within the guide tube 110; an impact tip 116 that is receivable within an opening formed in a lower end section of the main support body 108; and a travel-limiting assembly (hidden from view in FIG. 1) associated with the impact tip 116. The travel-limiting assembly is adjustable to define a variable maximum penetration depth of the impact tip 116 relative to the article 104. It should be appreciated that the travel-limiting assembly and/or any equivalent structure are exemplary means for limiting travel of the impact tip 116. In certain embodiments, the system 100 also includes or cooperates with a support structure 120. The support structure 120 is suitably configured and arranged to hold the main support body 108 in a fixed position relative to the article 104. The support structure 120 (and/or a separate support structure, which is not illustrated) may also be configured and arranged to hold the guide tube 110 in a fixed position relative to the main support body 108. The system 100 may also include or cooperate with an offset spacer 124 (not shown in FIG. 1, but depicted in FIG. 11) having a calibrated thickness to initialize an offset distance between the main support body 108 and the article 104. In certain implementations, the system 100 also includes or cooperates with support structure 128 that is suitably configured, arranged, and adjusted to hold, restrain, and orient the article 104 in a stationary position relative to the main support body 108.

FIG. 1 depicts the support structures 120, 128 in simplified schematic form. In practice, the support structures 120, 128 may include or be realized as any number of the following, individually or in any suitable combination: at least one gantry; at least one support rail or beam; at least one floor jack; at least one pedestal or platform; at least one leveling shim or spacer; at least one clamp; at least one strap or belt; a stabilizing or cushioning mat or material; a truss system; or the like. In accordance with certain embodiments, the support structure 120 utilizes a gantry support structure 132 and one or more horizontal beams 134. At least one of the horizontal beams 134 is coupled to the main support body 108 to hold it in place, and at least one of the horizontal beams 134 is coupled to the guide tube 110 to hold it in place. The horizontal beams 134 may be coupled to the main support body 108 and the guide tube 110 using any appropriate mechanism, device, fastener, or tool (e.g., clamps, bolts or screws, or clips). In accordance with certain embodiments, the support structure 128 includes components or material that supports the bottom surface of the article 104 at the desired height and orientation. The support structure 128 may also include or cooperate with one or more restraining devices or tools, jacks or lifting mechanisms, weights (coupled to or resting on the top surface of the article 104), and/or other components that maintain the article 104 in the desired position during impact testing. The two support structures 120, 128 can be initialized and adjusted as needed such that the main support body 108 remains in a fixed location relative to the target position on the exposed surface of the article 104. Between iterations of impact testing, the support structure 120 and/or the support structure 128 can be moved, adjusted, or repositioned as needed for purposes of re-targeting the impact tip 116.

Figure 2:
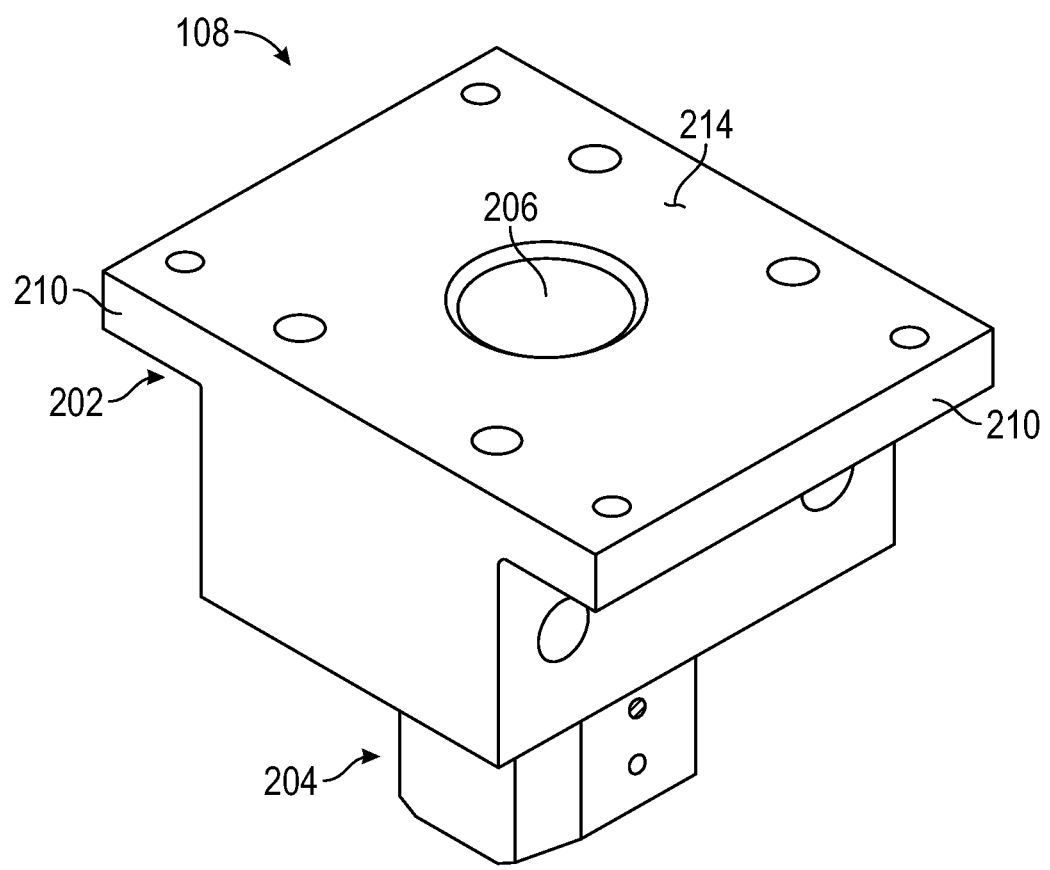
FIG. 2 is a top perspective view of a main support body suitable for use with the system depicted in FIG. 1.
Figure 3:
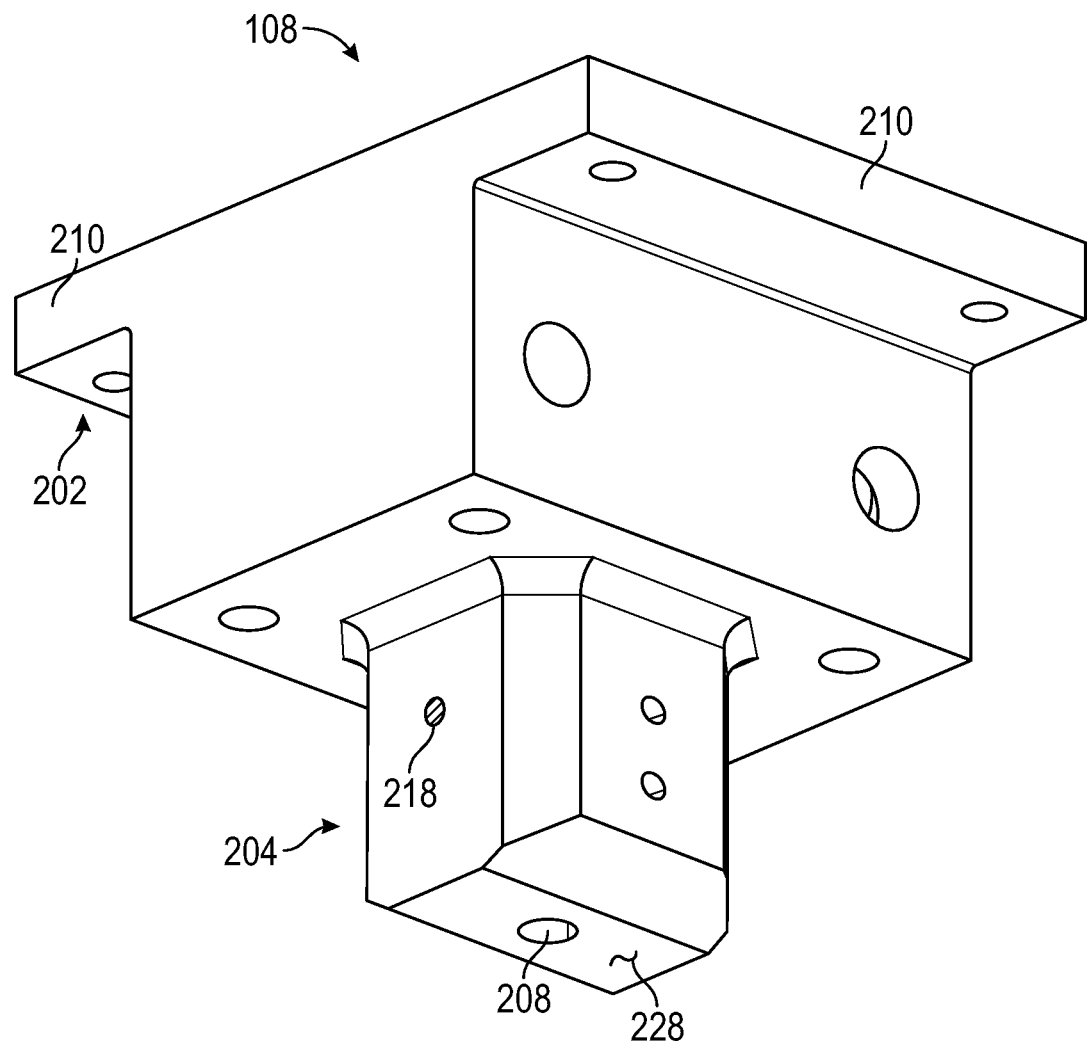
FIG. 3 is a bottom perspective view of the main support body.
Figure 4:
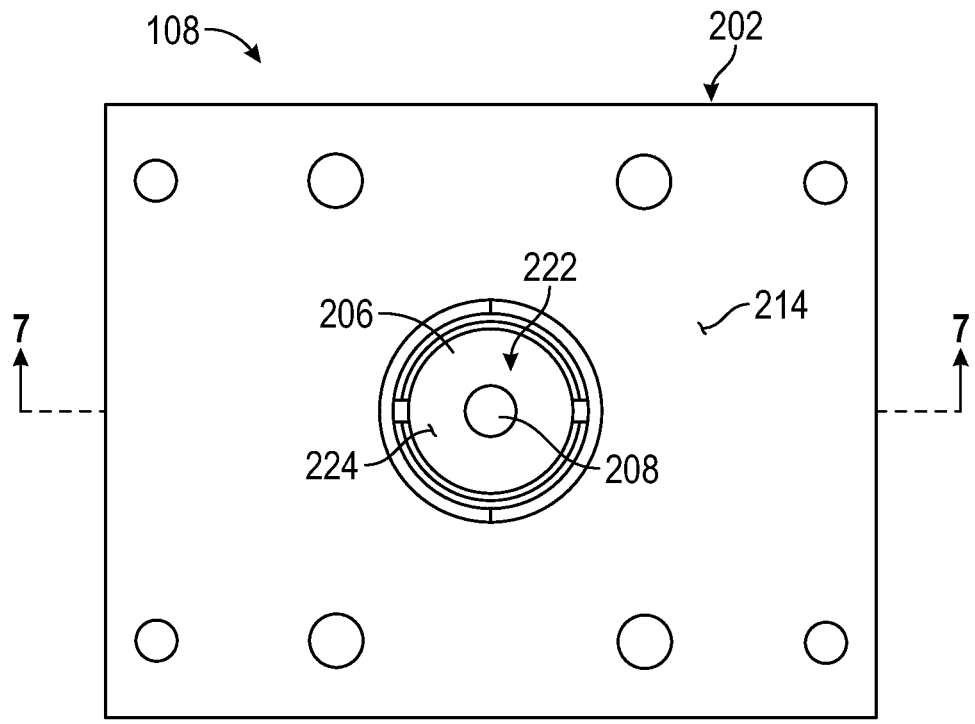
FIG. 4 is a top view of the main support body.
Figure 5:
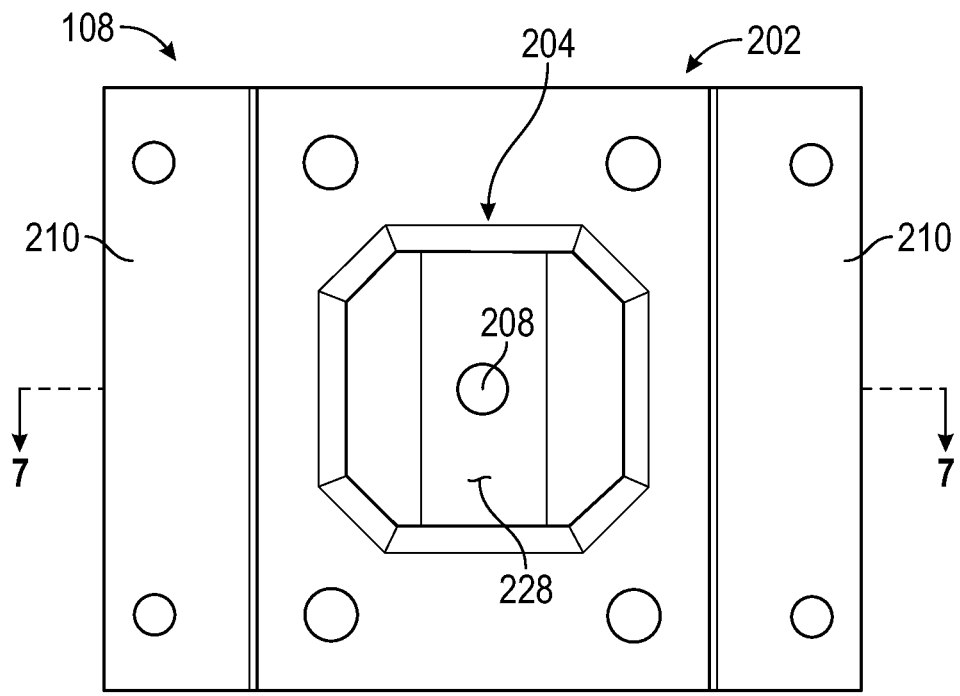
FIG. 5 is a bottom view of the main support body.
Figure 6:
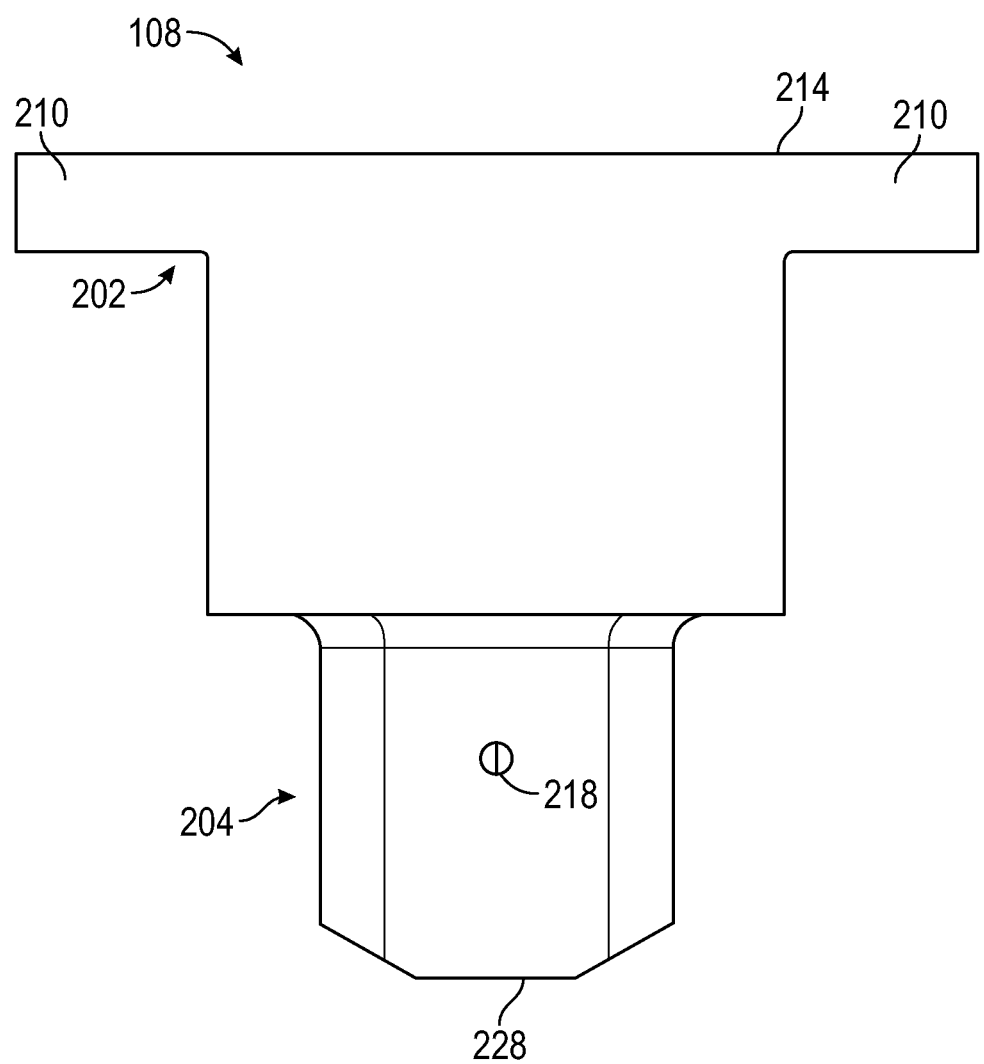
FIG. 6 is a side view of the main support body.
Figure 7:
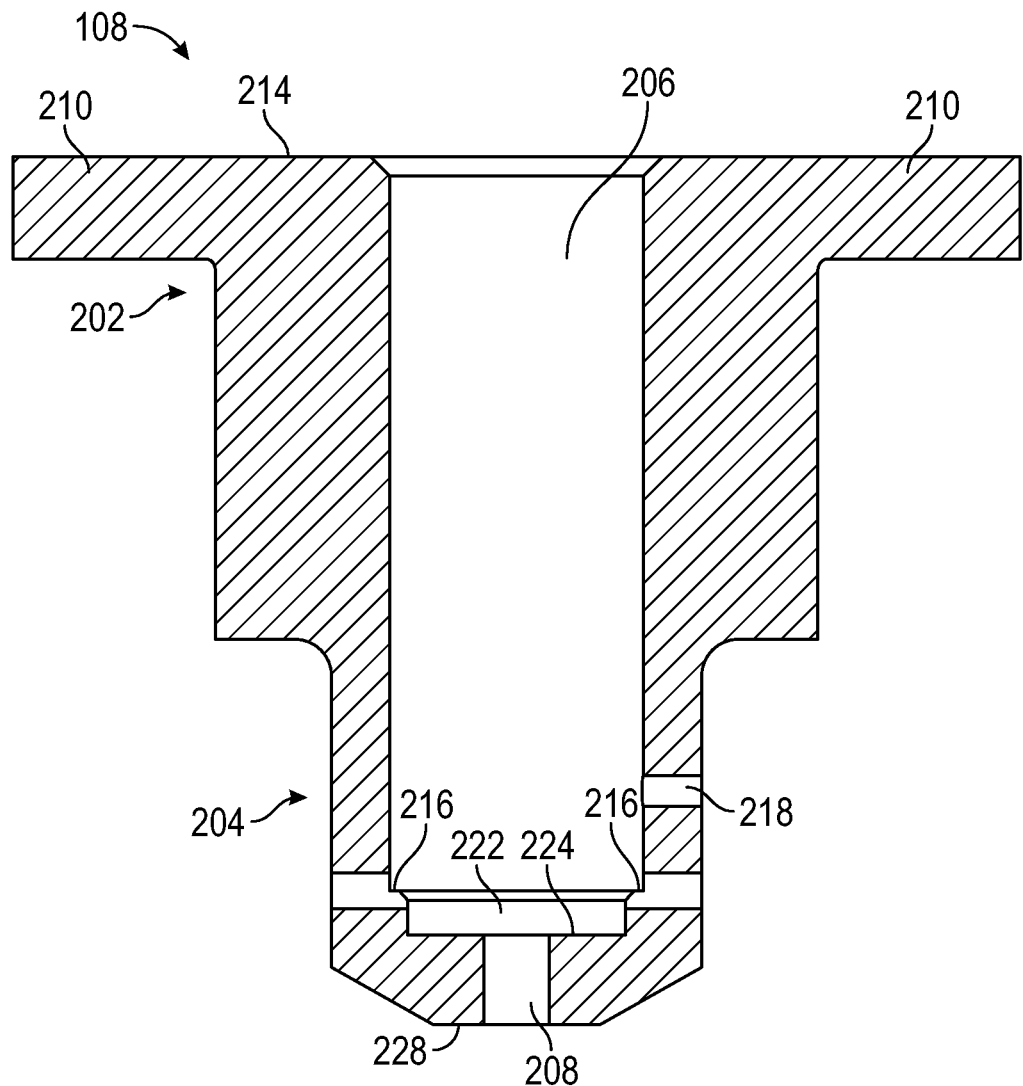
FIG. 7 is a cross sectional view of the main support body as viewed along the sectional line 7-7 that appears in FIG. 4 and FIG. 5.

FIGS. 2-7 are different views of an exemplary embodiment of the main support body 108. More specifically: FIG. 2 is a top perspective view; FIG. 3 is a bottom perspective view; FIG. 4 is a top view; FIG. 5 is a bottom view; FIG. 6 is a side view; and FIG. 7 is a cross sectional view from the perspective of the sectional line 7-7 that appears in FIG. 4 and FIG. 5. The main support body 108 can be fabricated from any appropriately tough, strong, and rigid material, such as steel or aluminum. In certain embodiments, the main support body 108 is a one-piece component that is machined from a solid stock of material or is otherwise fabricated to be a unitary component.

The illustrated embodiment of the main support body 108 is characterized by the following features, without limitation: an upper end section 202; a lower end section 204; a tube opening 206 formed in the upper end section 202; a tip opening 208 formed in the lower end section 204; and mounting flanges 210. As described in more detail below, certain features and characteristics of the main support body 108 are designed and configured to accommodate the guide tube 110, the impact tip 116, and the means for limiting travel of the impact tip.

The tube opening 206 begins at an upper surface 214 of the main support body 108, extends through a portion of the main support body 108, and terminates inside the main support body 108 at or near the lower end section 204 (see FIG. 7). The tube opening 206 is shaped and sized for compatibility with the guide tube 110. In accordance with the illustrated embodiment, the guide tube 110 and the tube opening 206 are cylindrical, and the guide tube 110 is sized such that it can be removably coupled to the main support body 108 as needed. The guide tube 110 can be secured within the tube opening 206 using at least one set screw received in a threaded hole 218 (see FIGS. 3, 6, and 7), using a suitably designed fitting or connector, via a threaded engagement with the tube opening 206, or the like.

Figure 11:
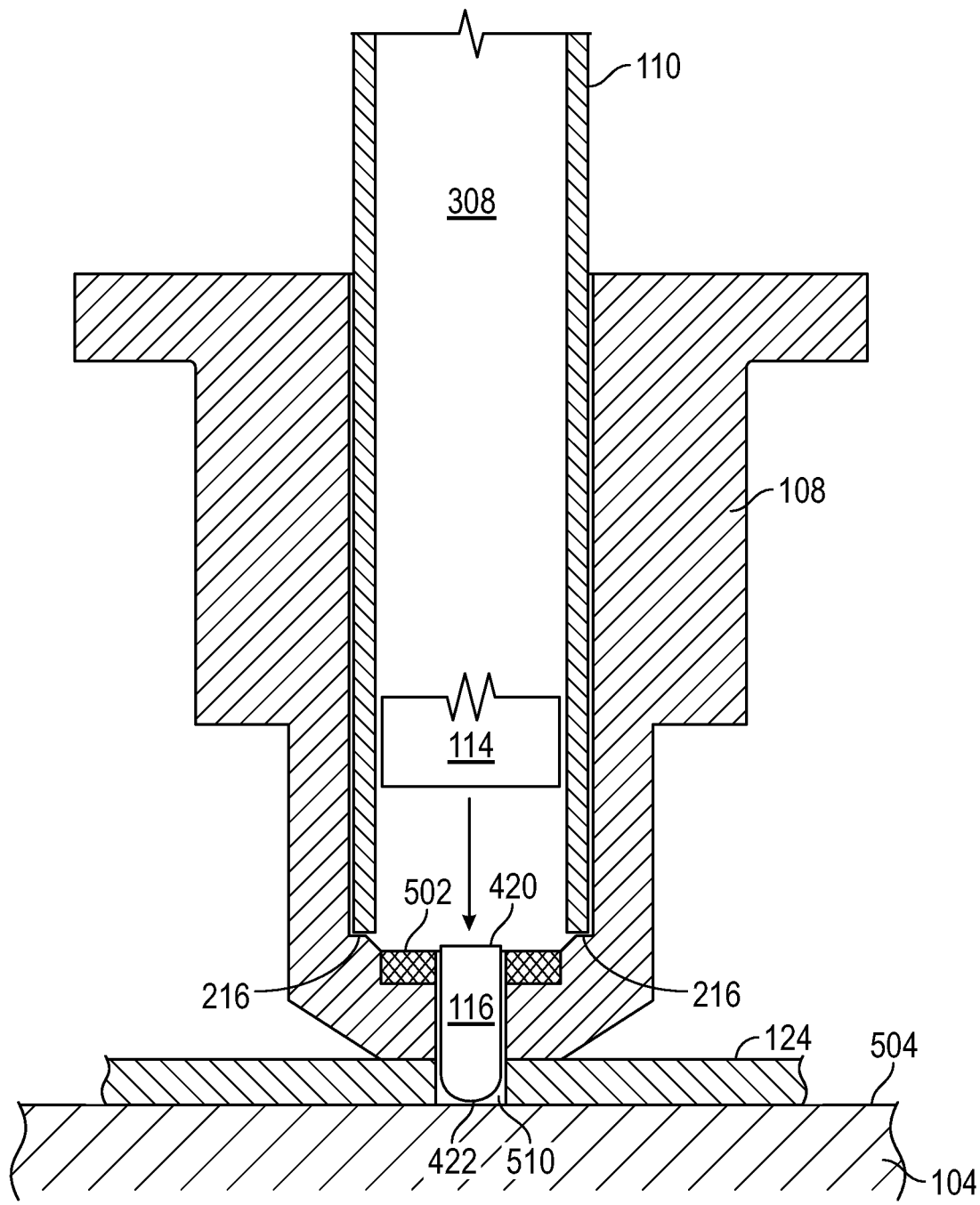
FIG. 11 is a simplified cross sectional view that includes some of the components of the system depicted in FIG. 1.
Figure 12:
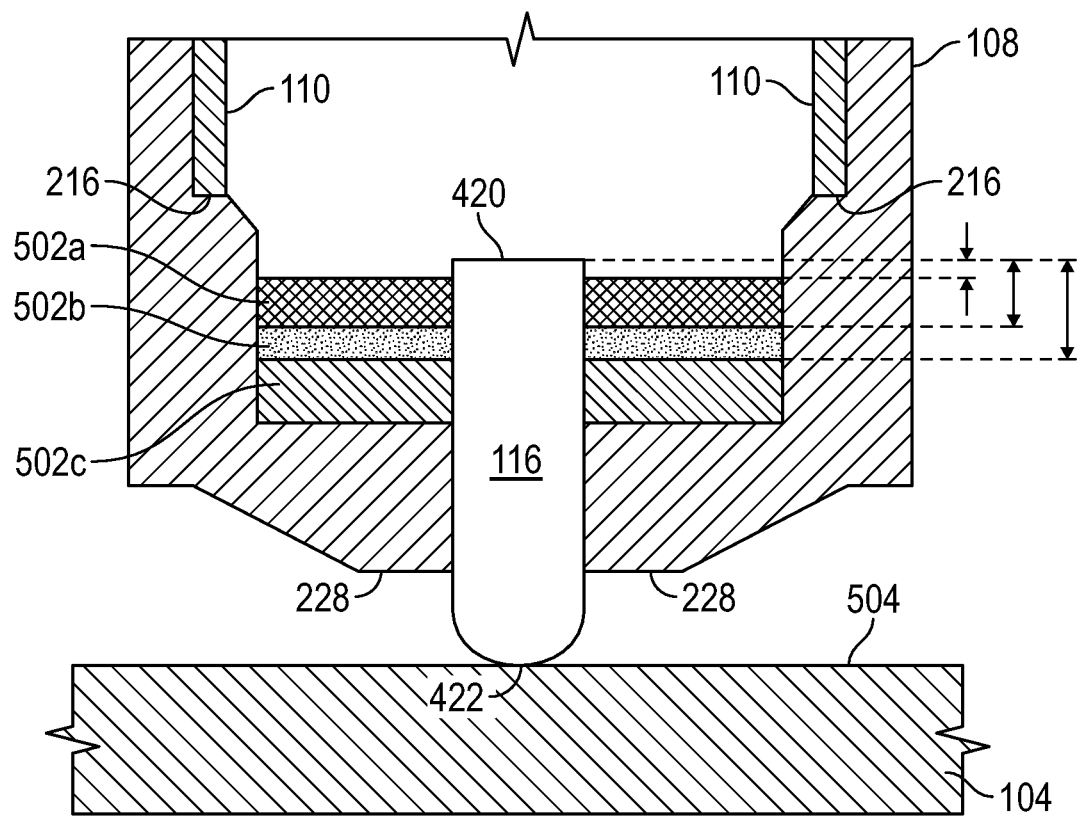
FIG. 12 is an enlarged cross sectional view that depicts some of the components of the system depicted in FIG. 1.

In accordance with the illustrated embodiment, the lower end of the tube opening 206 is associated with a ledge feature 216 that is formed within the lower end section 204. The ledge feature 216 is shown in FIGS. 7, 11, and 12. The ledge feature 216 serves as a base or platform to limit the insertion depth of the guide tube 110 within the main support body 108. In this regard, the lower end of the guide tube 110 can be seated against the ledge feature 216, as shown in FIGS. 11 and 12.

In certain embodiments, a spacer cavity 222 is formed within the lower end section 204 of the main support body 108. The spacer cavity 222 is depicted in FIGS. 4 and 7; the spacer cavity 222 is occupied in FIGS. 11 and 12. As shown in FIG. 7, the top of the spacer cavity 222 is continuous with at least a portion of the lower end of the tube opening 206. The spacer cavity 222 terminates at a base surface 224 that is defined within the lower end section 204. The top of the tip opening 208 is continuous with at least a portion of the spacer cavity 222. As shown in FIG. 7, the tip opening 208 extends between the lower end of the spacer cavity 222 and a lower end surface 228 of the main support body 108, such that the tip opening 208 is accessible from the bottom of the main support body 108.

The illustrated embodiment of the main support body 108 includes the mounting flanges 210 and/or other features that allow the main support body 108 to be affixed to the support structure 120. For example, the mounting flanges 210 can be positioned to rest on one or more of the horizontal beams 134 to inhibit movement of the main support body 108 during impact testing. The mounting flanges 210 may also be designed to accommodate coupling devices or elements such as clamps, fittings, fasteners, connectors, locks, or the like.

Figure 8:
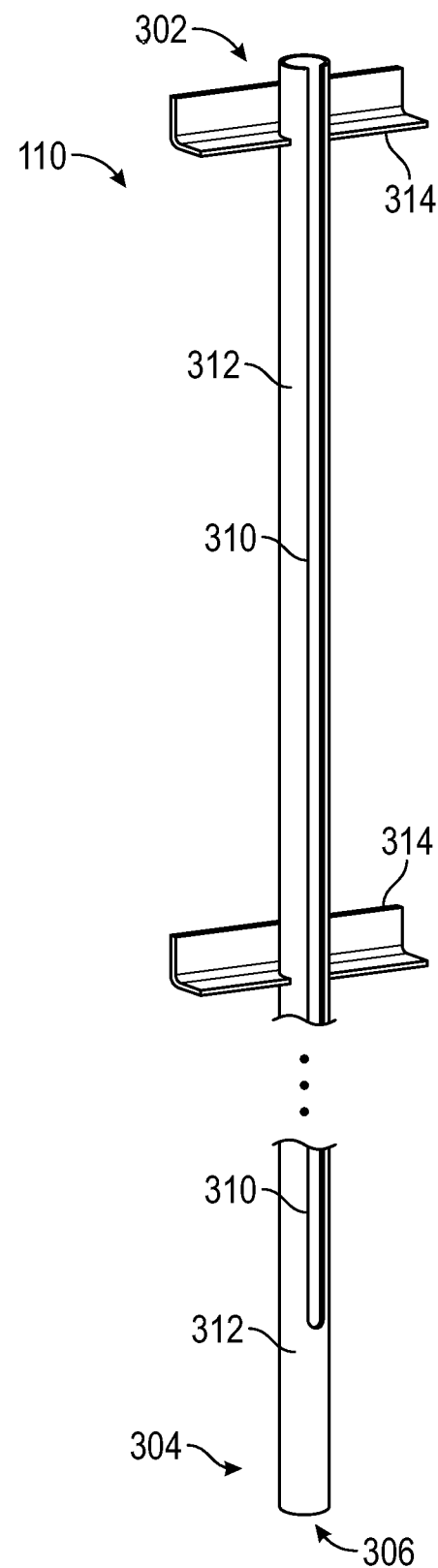
FIG. 8 is a perspective view of a guide tube suitable for use with the system depicted in FIG. 1.

The guide tube 110 is compatible with the main support body 108, and it can be removably coupled to the main support body 108 as needed to support the impact testing methodology presented here. FIG. 8 is a perspective view of an exemplary embodiment of the guide tube 110. Due to space limitations, FIG. 8 depicts the guide tube 110 in an arbitrarily separated fashion with an intermediate section removed. The guide tube 110 includes an upper end region 302, a lower end region 304 that terminates at an opening 306; a hollow interior passageway 308 (shown in FIG. 11); and a longitudinal slot 310 formed in a sidewall 312 of the guide tube 110. The illustrated embodiment of the guide tube 110 also includes mounting structure 314.

The lower end region 304 of the guide tube 110 fits inside the tube opening 206 of the main support body 108, and can be secured in position during impact testing. The hollow interior passageway 308 accommodates the adjustable weight assembly 114, as described above with reference to FIG. 1. The adjustable weight assembly 114 is slidable within the hollow interior passageway 308, such that it can be raised to a desired initial height and released to fall toward the lower end region 304 during impact testing. When the guide tube 110 is coupled with the main support body 108, the bottom end surface of the guide tube 110 rests against the ledge feature 216 (see FIG. 11 and FIG. 12). When the guide tube 110 is installed in this manner, the opening 306 provides access (from the top) to the impact tip 116.

Figure 9:
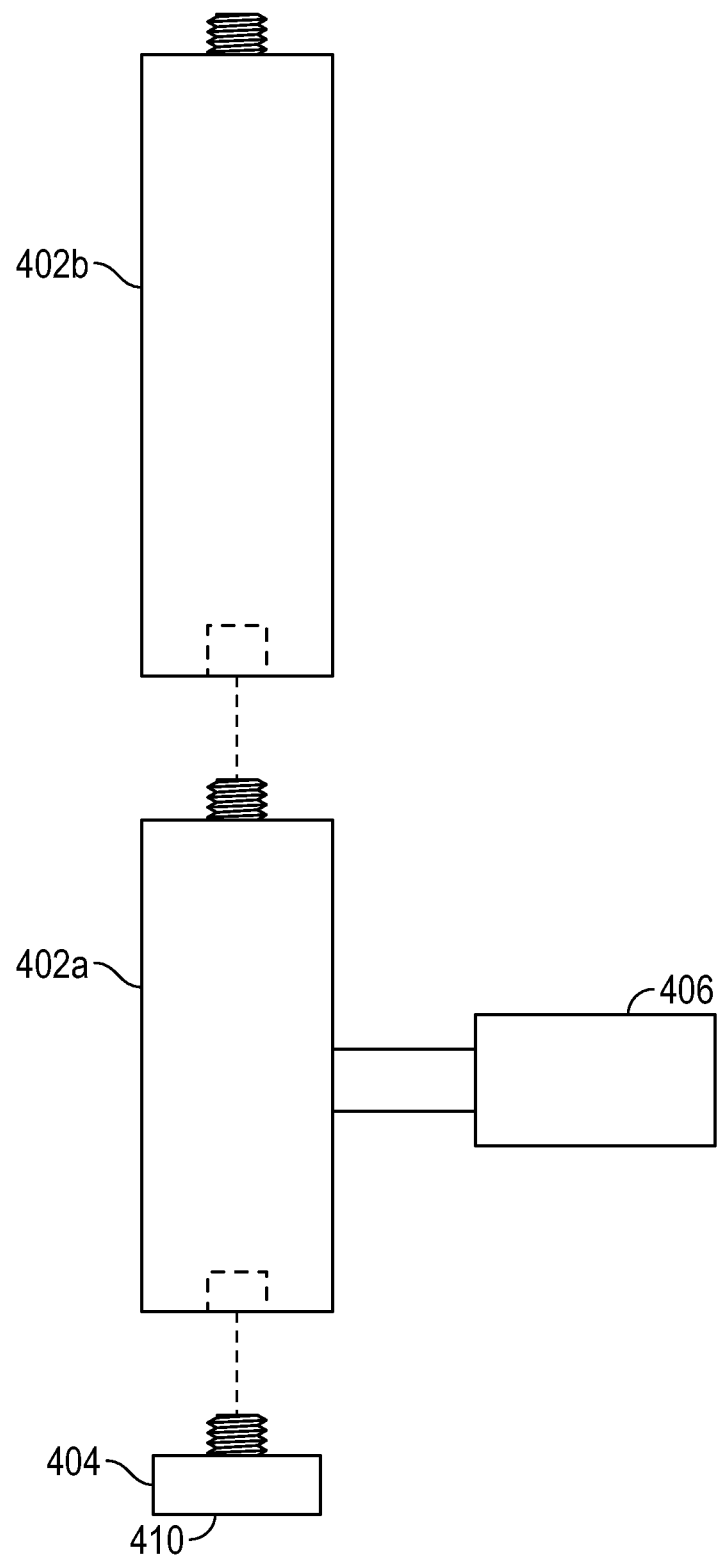
FIG. 9 is an exploded side view of an adjustable weight assembly suitable for use with the system depicted in FIG. 1.

FIG. 9 is an exploded side view of an exemplary embodiment of the adjustable weight assembly 114. The depicted embodiment of the adjustable weight assembly 114 includes, without limitation: at least one weight 402; a hammer tip component 404; and a handle 406. In certain implementations, the adjustable weight assembly 114 includes a plurality of discrete weights 402 that are coupled together and combined to provide a specified drop weight that is to be used during an impact test. FIG. 9 shows two weights 402*a*, 402*b*, but the ellipses between the two weights 402 indicates that any number of additional weights 402 can be added to obtain the desired drop weight. In an alternate implementation, the adjustable weight assembly 114 utilizes only one weight 402, which may be selected from a kit or assortment of available weights. As one non-limiting example, the weights 402 are fabricated from a heavy and durable material such as brass, and they can be coupled together via a threaded engagement, fasteners, threaded inserts, or the like.

Figure 10:
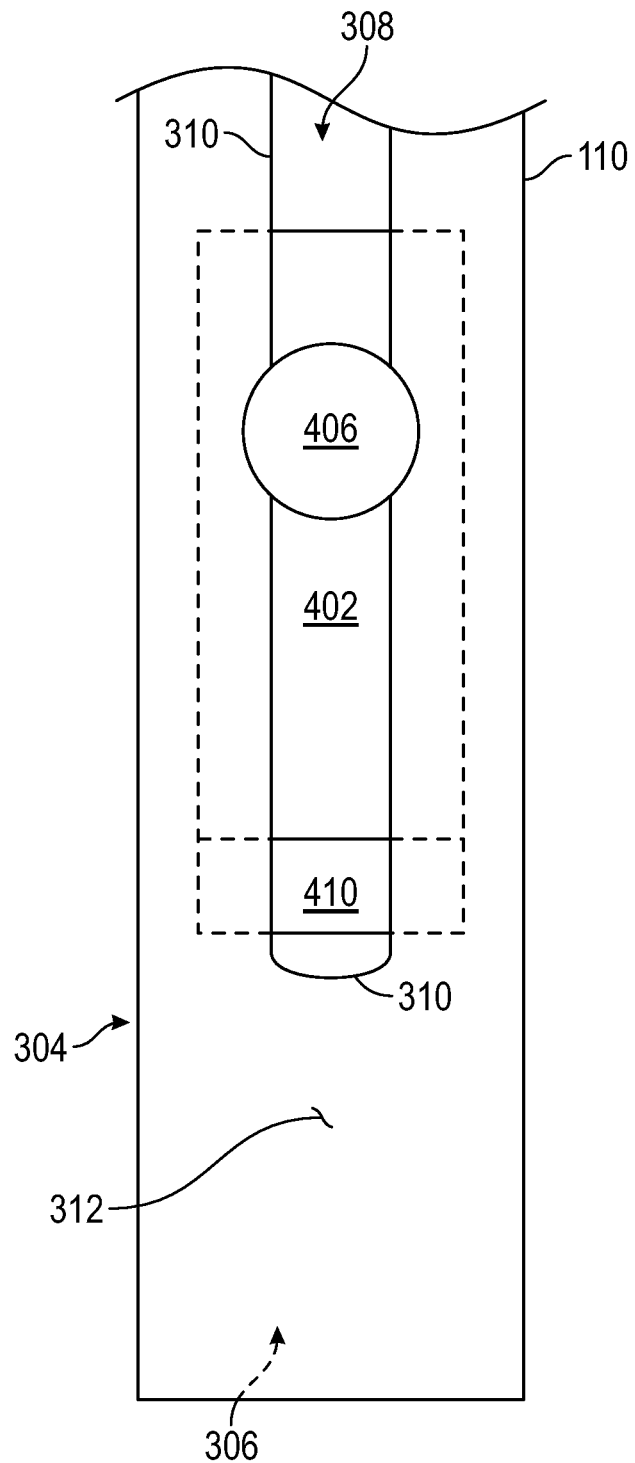
FIG. 10 is a front view that depicts the adjustable weight assembly positioned inside the guide tube.

The hammer tip component 404 may be a removable component (as depicted in FIG. 9) or it may be affixed to or integrated with the lowermost weight 402 of the adjustable weight assembly 114. In some embodiments, the hammer tip component 404 is coupled to a weight 402 via a threaded engagement. The hammer tip component 404 is preferably fabricated from a tough and durable material such as brass, steel, iron, or the like. The hammer tip component 404 includes an impact surface 410 that is configured and arranged to strike the upper end of the impact tip 116 when the adjustable weight assembly 114 is released to fall within the guide tube 110 (this action is described in more detail below with reference to FIGS. 11-13). The handle 406 is removably coupled or fixed to a weight 402 to facilitate lifting of the adjustable weight assembly 114 to an initial height within the hollow interior passageway 308 of the guide tube 110. The weight of the handle 406 is considered when calibrating or configuring the adjustable weight assembly 114. As illustrated in FIG. 10, the longitudinal slot 310 accommodates a portion of the handle 406 to allow the handle 406 to travel up and down as the adjustable weight assembly 114 moves within the hollow interior passageway 308.

Referring to FIG. 11 and FIG. 12, an upper end 420 of the impact tip 116 is accessible via the opening 306 of the guide tube 110 (when the guide tube 110 is coupled to the main support body 108). Thus, the adjustable weight assembly 114 strikes the upper end 420 of the impact tip 116 when the adjustable weight assembly 114 is released to fall within the guide tube 110 (as schematically depicted in FIG. 11). For the particular embodiment described here, the impact surface 410 of the hammer tip component 404 strikes the upper end 420 of the impact tip 116, which in turn urges the lower end 422 of the impact tip 116 against the surface of the article.

It should be appreciated that the adjustable weight assembly 114 (which may include one or more weights 402, the hammer tip component 404, and the handle 406) represents one exemplary means for impacting the impact tip 116 with a specified amount of energy, e.g., a predetermined maximum energy. Alternatively or additionally, the system 100 can include or cooperate with other components, devices, or subsystems that serve as the means for impacting the impact tip 116. For example, the means for impacting may include a pneumatically actuated element, a spring loaded element, a projectile, a pendulum impactor, or the like.

Referring to FIGS. 1, 11, and 12, the impact tip 116 is movable within the tip opening 208 of the main support body 108 such that an exposed length of the impact tip 116 protrudes outside of the main support body 108 during impact testing. In certain embodiments, the impact tip 116 resides within the tip opening 208 in an unrestrained manner such that it is free to move. The impact tip 116 may be primarily cylindrical in shape with a rounded portion that forms its lower end 422. The outer diameter of the impact tip 116 is slightly less than the inner diameter of the tip opening 208.

With reference to FIGS. 7, 11, and 12, the exemplary embodiment employs the spacer cavity 222 and at least one spacer 502 as a travel-limiting assembly for the impact tip 116. FIG. 11 depicts a configuration where only one spacer 502 is utilized. In contrast, FIG. 12 depicts another configuration wherein the travel-limiting assembly includes a plurality of stackable spacers 502. Although not always required, the example of FIG. 12 uses three stackable spacers 502 that together define an overall spacer height. The particular spacer height is chosen to regulate the amount of the impact tip 116 that is exposed above the spacer(s) 502 before impact (see FIG. 11 and FIG. 12, both of which depict the initial state of the impact tip 116 prior to impact—where a portion of the impact tip 116 extends above the uppermost surface of the spacer(s) 502). Notably, each spacer 502 has a hole formed therein to accommodate passage and translation of the impact tip 116 during use. To this end, each spacer 502 may be realized as a rigid ring-shaped or donut-shaped washer or shim having a specified or predetermined thickness. The number of spacers 502 and the thickness of each spacer 502 can be selected as appropriate to provide the desired overall height. In certain non-limiting implementations, the thickness of the spacers 502 range between about 0.05 inch to about 0.30 inch, which provides flexibility to create various spacer stacks to obtain the desired overall height.

For the embodiment described here, the travel-limiting assembly (e.g., selectable spacers having different spacer thicknesses) is suitably configured to define a plurality of discrete maximum penetration depths of the impact tip 116 relative to the surface 504 of the article 104. A shorter overall spacer height will result in a deeper maximum penetration depth, and a taller overall spacer height will result in a shallower maximum penetration depth, because the top of the spacer 502 (or stack of spacers 502) serves as a physical stop that limits the range of downward travel of the adjustable weight assembly 114. More specifically, the top of the spacer 502 (or stack of spacers 502) defines the limit of travel of the impact surface 410 of the hammer tip component 404.

Referring to FIG. 12, the illustrated combination of three spacers (502*a*, 502*b*, and 502*c*) provides a relatively shallow maximum penetration depth, as indicated by the shortest double-headed arrow. Use of only the spacer 502*c* provides a relatively deep maximum penetration depth, as indicated by the longest double-headed arrow. Use of the spacer 502*b* in combination with the spacer 502*c* provides a relatively intermediate maximum penetration depth, as indicated by the mid-length double-headed arrow. The defined maximum penetration depth corresponds to the length of the impact tip 116 that extends above the uppermost surface of the spacer (s) 502 when the system is in an initial pre-impact state as shown in FIG. 11 and FIG. 12 (where the lower end 422 of the impact tip 116 rests on the surface of the article 104 to be impacted).

It should be appreciated that the spacer cavity 222, corresponding structure of the main support body 108, and spacer(s) 502 represent one exemplary means for limiting travel of the impact tip 116, which is adjustable to define a variable maximum penetration depth of the impact tip 116 relative to the surface 504 of the article 104. Alternatively or additionally, the system 100 can include or cooperate with other components, devices, or subsystems that serve as the means for limiting travel of the impact tip 116. For example, the means for limiting travel may include or be realized as any of the following, without limitation: a moveable platform or base having an adjustable height; one or more threaded elements (similar to a bolt or a screw) that can be adjusted to extend to a specified height within the spacer cavity 222; removable or adjustable pins or rods that extend sideways into the spacer cavity 222, wherein the installed height of such pins or rods can be selected to limit travel of the impact tip 116; removable or adjustable pins or rods that extend sideways into the hollow interior passageway 308, wherein the installed height of such pins or rods can be selected to limit travel of the adjustable weight assembly 114.

FIG. 11 depicts the main support body 108 in an initial position relative to the article 104 that is to be impacted. When in the initial position, the main support body 108 is supported in a fixed position with a defined distance between the lower end surface of the main support body 108 and the upper surface of the article 104. The impact tip 116 extends through the tip opening 208 and rests on the upper surface of the article 104. For the reasons explained above, it is important to maintain this desired amount of separation because the defined distance influences the maximum penetration depth of the impact tip 116. Accordingly, the depicted embodiment uses the offset spacer 124 to initialize the offset distance between the lower end surface of the main support body 108 and the article 104. The offset spacer 124 also serves as a guide to ensure that the impact tip 116 is normal to the targeted surface of the article. During the setup of the system, the bottom surface of the main support body 108 rests against the top surface of the offset spacer 124. The orientation of the main support body 108 can be adjusted as needed (using, e.g., shims) to accommodate situations where the targeted surface is not exactly parallel to the ground.

The offset spacer 124 has a calibrated thickness corresponding to the desired offset distance, wherein the thickness influences the maximum dent depth that can be made by the impact tip 116. In certain non-limiting embodiments, the offset spacer 124 has a thickness within the range of about 0.125 inch to about 0.8 inch. The offset spacer 124 may include an opening 510 formed therein (e.g., a slot, a hole, or a cutout) to accommodate a protruding portion of the impact tip 116 that extends from the lower end surface of the main support body 108. In certain embodiments, the opening 510 is realized as a slot that extends from an edge of the offset spacer 124. The slot configuration allows the offset spacer 124 to be positioned during initialization as shown in FIG. 11, and subsequently removed (without having to remove the impact tip 116 from the main support body 108) before performing the impact test. FIG. 12 shows the main support body 108 and the impact tip 116 in the initial position after removal of the offset spacer 124.

Figure 13:
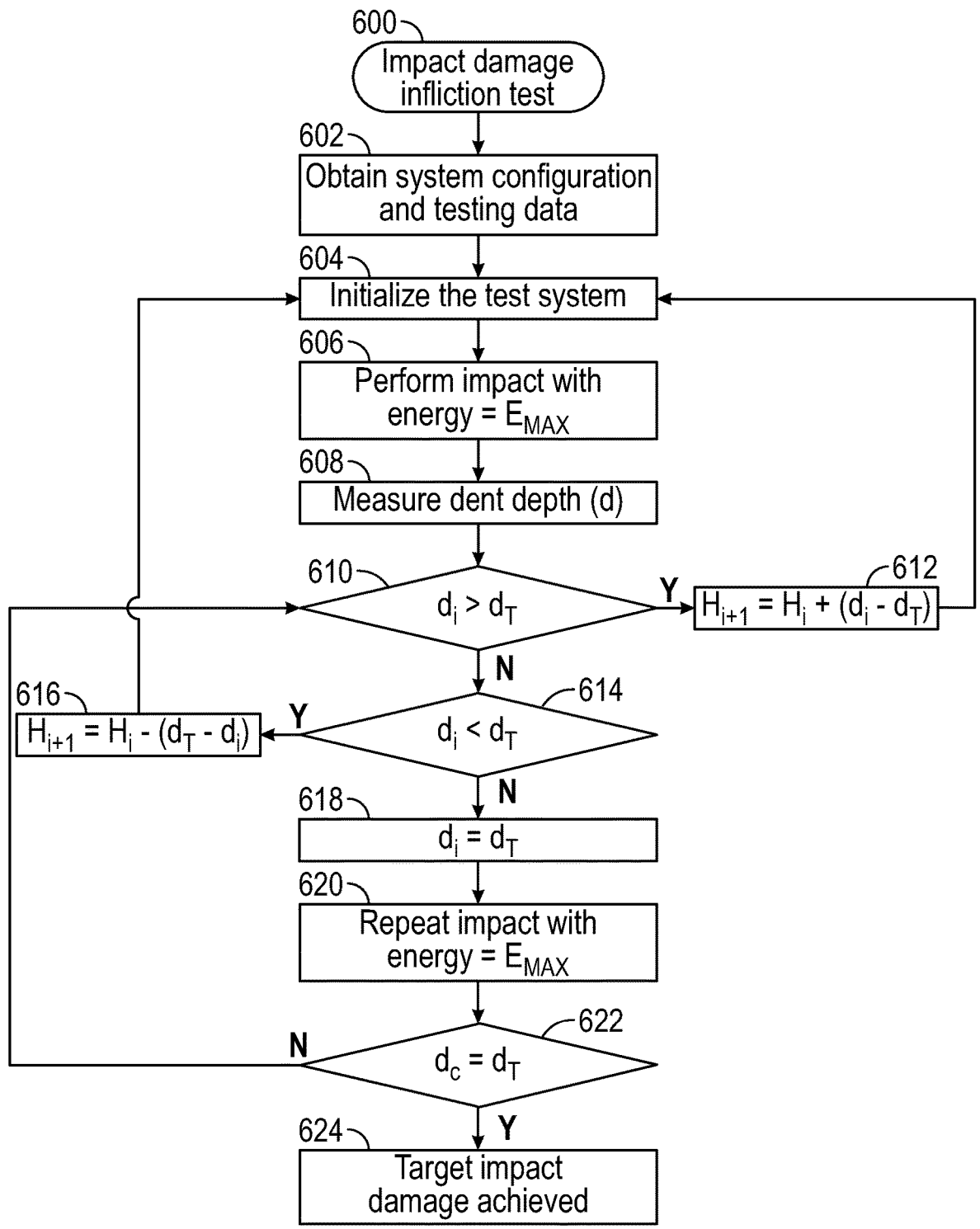
FIG. 13 is a flow chart that illustrates an exemplary embodiment of a method for inflicting structural impact damage to an article.

The system 100 described above, or any equivalent implementation or embodiment thereof, can be utilized to perform structural impact tests on various articles. In this regard, FIG. 13 is a flow chart that illustrates an exemplary embodiment of a process 600 for inflicting structural impact damage to an article. For illustrative purposes, the following description of the process 600 may refer to elements mentioned above in connection with FIGS. 1-12. In practice, portions of the process 600 may be performed by different elements of the described system. It should be appreciated that the process 600 may include any number of additional or alternative tasks, the tasks shown in FIG. 13 need not be performed in the illustrated order, and the process 600 may be incorporated into a more comprehensive procedure or process having additional functionality not described in detail herein. Moreover, one or more of the tasks shown in FIG. 6 could be omitted from an embodiment of the process 600 as long as the intended overall functionality remains intact.

The described implementation of the process 600 contemplates any number of iterations that are intended to calibrate the impact damage infliction test system using a test article that is similar, equivalent, or identical to a specimen article to be impact tested. One or more calibrating iterations are performed at a "practice zone" of the test article until impact damage with a specified dent depth is observed. In accordance with typical test procedures, the practice zone is at least two inches away from the actual intended target of the test article. After the specified dent depth is measured in the practice zone, a confirmation impact iteration is performed at the actual intended target of the test article (which is at the same or a structurally equivalent location to be tested on the specimen article). If the specified dent depth is confirmed at the intended target, the calibrated test system can then be used to create the same type of impact damage at the desired target location on the specimen article. Proper calibration and setup of the test system ensures that the specimen article suffers an impact damage with the target dent depth.

The depicted embodiment of the process 600 begins by obtaining the necessary system configuration and testing data (task 602). The data obtained at task 602 may differ depending on various factors and considerations, including, without limitation: the particular testing procedure, requirements, goals, and/or conditions; the design or configuration of the article(s) under test; the material(s), composition, or mechanical properties of the article(s) under test; environmental conditions; or the like. In accordance with certain implementations, the data obtained at task 602 may include, without limitation: a designated or maximum impact energy ($E_{MAX}$) to be utilized during impact testing; the target dent depth ($d_T$) that is to be formed in the surface of the article under test; the length of the impact tip (the particular length can be selected as needed for the particular application and configuration of the article); the height of the offset spacer that is used to initialize the system; and an initial configuration, setting, or dimension of the means for limiting travel of the impact tip. For the exemplary embodiment described above, where the means for limiting accommodates stackable spacers, an initial spacer height may be provided at task 602. For example, an initial spacer height of zero may be specified such that the first iteration of the impact test is performed without any internal spacers, which results in the deepest allowable penetration depth of the impact tip. Alternatively, a nonzero initial spacer height can be defined such that the first iteration of the impact test is performed with at least one internal spacer in place. In practice, the intended goal of the first impact iteration is to observe a dent that is deeper than the target dent depth, such that the system can be calibrated with subsequent impact iterations that result in shallower resulting dent depths (until the desired target dent depth, $d_T$, is observed).

The test system is initialized (task 604) in accordance with at least some of the data obtained at task 602. The initializing readies the test system to obtain the specified target dent depth in the exposed surface of the test article. In accordance with certain embodiments, the test system is initialized by configuring the adjustable weight assembly to obtain a calibrated weight or mass. A calibrated height may also be calculated based on the calibrated weight and the specified value of $E_{MAX}$. Accordingly, the calibrated weight assembly is lifted to the calibrated height from which it will be released. The initializing may also configure the test system to provide the initial spacer height, install the impact tip, and arrange the positions of the main support body and the test article with the offset spacer in place and the end of the impact tip resting on the surface of the test article (see FIG. 11). The position of the test article can be adjusted as necessary—using, for example, shims, adjusters, blocks, or spacers—such that the guide tube is perpendicular to the surface of the article at the impact location. As explained above, initializing the test system with the initial spacer height results in a first maximum penetration depth for the impact tip. After fixing the position of the main support body relative to the test article, the offset spacer can be removed.

After initializing the test system, the process 600 continues by performing an impact iteration at a target location within the practice zone of the test article, using the specified $E_{MAX}$ (task 606). In this regard, the means for impacting (e.g., the weight assembly) is operated to apply the specified $E_{MAX}$ to the impact tip, using the initial maximum penetration depth configuration. For the exemplary embodiment, task 606 is performed by releasing the calibrated weight assembly from its calibrated height, which causes the weight assembly to strike the top of the impact tip. The weight assembly can be manually lifted to the desired height (the guide tube may include or cooperate with appropriate measurement markings, a height scale, a ruler, or a tape measure), held in place, and manually released at the appropriate time. In some embodiments, the weight assembly can be lifted to the desired height and held in place by a suitably configured latching mechanism, a lock, a lever, one or more supporting pins or plates or arms, an actuatable door or shelf, or the like—and thereafter released by actuating, activating, or otherwise manipulating the device, component, or element that is holding it in place.

Thereafter, the process 600 continues by measuring the resulting dent depth (if any) that is formed in the surface of the test article in response to movement of the impact tip caused by the impact (task 608). Measurement of the dent depth may require removal or movement of the test article and/or removal or movement of the main support body of the test system. In addition, it may be necessary to raise or remove the weight assembly from the impact tip. Task 608 may employ or be performed by a depth gauge having appropriate accuracy, precision, and measurement tolerance. This example assumes that a measurable dent is created with the first impact iteration. A scenario where the first impact iteration results in no measurable dent is mentioned below.

The process 600 continues by comparing the resulting dent depth ($d_i$) against the target dent depth, $d_T$. In FIG. 13, the subscript letter "i" is used to indicate the current impact iteration. The illustrated version of the process 600 checks whether the resulting dent depth is greater than the target dent depth by at least a specified tolerance value (query task 610). If $d_i > d_T$ (the "Yes" branch of query task 610), the test system is adjusted for the next impact iteration in an attempt to create a shallower impact dent. More specifically, the means for limiting can be adjusted to change the first maximum penetration depth to a new maximum penetration depth. For the scenario where the resulting dent depth is deeper than the target dent depth, the process 600 adjusts the means for limiting such that the second maximum penetration depth is shallower than the first maximum penetration depth. Task 612 in FIG. 13 contemplates adjustment of the means for limiting that involves increasing the overall spacer height for the next impact iteration: $H_{i+1} = H_i + (d_i - d_T)$. In this relationship, H represents the overall height of one or more spacers used to define the maximum penetration depth, $H_i$ is the overall spacer height for the current impact iteration, and $H_{i+1}$ is the overall spacer height for the next impact iteration. According to this relationship, the overall spacer height for the next impact iteration will be increased by an amount corresponding to the difference between the measured dent depth for the current impact iteration and the desired target dent depth (plus or minus any practical tolerance associated with the available assortment of spacers).

After increasing the overall spacer height (task 612), the process 600 may return to task 604 to re-initialize the test system and prepare for the next impact iteration with the same designated impact energy ($E_{MAX}$). Re-initializing the test system may involve, without limitation, repositioning the main support body and/or the test article to target an undamaged location within the practice zone of the test article, and raising the weight assembly to the prescribed height. Thus, the process 600 can change the position of the test article relative to the test system, to expose an undamaged target location with similar backing structure on the surface of the test article. The presence of similar backing structure (or internal construction) is particularly important when the article is a composite component and/or an assembly of different materials, e.g., a test article having spars, air gaps, or discontinuities under the targeted surface. Thereafter, the impact infliction procedure can be repeated to force the impact tip against the undamaged target location. The next impact iteration is performed using the same $E_{MAX}$ but the different maximum penetration depth that corresponds to the increased overall spacer height.

Referring again to query task 610, if $d_i$ is not greater than $d_T$ (the "No" branch of query task 610), then the process 600 continues by checking whether $d_i$ is less than $d_T$ by at least a specified tolerance value (query task 614). If $d_i < d_T$ (the "Yes" branch of query task 614), the test system is adjusted for the next impact iteration in an attempt to create a deeper impact dent. More specifically, the means for limiting can be adjusted to change the first maximum penetration depth to a deeper maximum penetration depth. For the scenario where the resulting dent depth is shallower than the target dent depth, the process 600 adjusts the means for limiting such that the second maximum penetration depth is deeper than the first maximum penetration depth. Task 616 in FIG. 13 contemplates adjustment of the means for limiting that involves decreasing the overall spacer height for the next impact iteration: $H_{i+1} = H_i - (d_T - d_i)$. According to this relationship, the overall spacer height for the next impact iteration will be decreased by an amount corresponding to the difference between the target dent depth and the measured dent depth for the current impact iteration (plus or minus any practical tolerance associated with the available assortment of spacers).

After decreasing the overall spacer height (task 616), the process 600 may return to task 604 to re-initialize the test system and prepare for the next impact iteration with the same designated impact energy ($E_{MAX}$). As mentioned above, the impact infliction procedure can be repeated to force the impact tip against an undamaged target location within the practice zone of the test article. The next impact iteration is performed using the same $E_{MAX}$ and the adjusted maximum penetration depth that corresponds to the decreased overall spacer height.

At 618, the process 600 has determined that the currently measured dent depth ($d_I$) is equal to the desired target dent depth ($d_T$), within a defined measurement tolerance. In response to such a determination, the impact test is repeated with the same $E_{MAX}$ to check for consistency (task 620). More particularly, the process 600 may continue by changing the position of the test article relative to the test system to expose an undamaged target location on the surface of the test article that corresponds to the actual intended target of the test article. As mentioned above, the confirmation target location is outside of the practice zone of the test article. After repositioning the system, the impact infliction procedure is repeated with the same $E_{MAX}$ applied and with the same depth-limiting configuration to provide the calibrated maximum penetration depth for the impact tip. In other words, the same test setup and impact infliction operation is used to create a confirmation dent at the fresh target location.

The process 600 may continue by confirming whether or not the depth of the confirmation dent ($d_C$) is consistent with the target dent depth ($d_T$). In FIG. 13, query task 622 checks whether the measured depth of the confirmation dent is equal (within a defined measurement tolerance) to the target dent depth. If $d_C=d_T$ (the "Yes" branch of query task 622), then it is assumed that the desired impact damage has been created at the intended target location, with the current overall spacer height (task 624). Thereafter, the test article can be replaced with the desired specimen article, the test system can be initialized and otherwise prepared to deliver an impact, and the test system can be operated as described above. The test system is operated to apply $E_{MAX}$ to the impact tip, which in turn creates a dent on the surface of the specimen article. The calibration of the test system ensures that the target dent depth will be achieved on the specimen article. Referring again to query task 622, if the measured depth of the confirmation dent is different than the target dent depth (the "No" branch of query task 622), then the process 600 may return to query task 610 for purposes of adjusting the height of the spacer(s) as needed for another impact iteration and for purposes of recalibrating the system.

The process 600 contemplates any number of repeated impact iterations, using one or more test articles as needed to obtain a repeatable impact that creates the desired target dent depth. If the target dent depth cannot be obtained with the maximum applied energy, $E_{MAX}$, then the test point requirements need to be reevaluated to either change the energy or the target location. For example, the weight assembly can be raised to a higher starting position before being released and/or additional weight can be added to increase the overall energy. If the testing specifications or requirements prohibit an increase in the maximum applied energy, then an alternative impact test point or another solution may be considered.

The foregoing description of the process 600 assumes that the first impact iteration results in a measurable dent on the surface of the test article. In certain scenarios, however, the first impact iteration may leave the surface undamaged or only slightly blemished without creating a measurable dent. In this regard, it is possible that the material is so hard that no dent or only a very small dent is achieved with the maximum applied energy. In this case, the impact surface contacts the top of the impact tip but never contacts the upper surface of the spacer(s). In this situation, the focus shifts from getting the correct dent depth to test article safety (e.g., ensuring that the actual specimen article is not damaged if there is an unknown difference in the two targets). Accordingly, it may be desirable to add height to the spacer stack to limit travel of the impact tip. Under ideal conditions with a uniform hard surface, spacers would be unnecessary because the impact tip will never travel far enough. Nonetheless, due to the amount of damage associated with removing an impact tip that is embedded in the surface of the article, a spacer height can provide a margin of safety. One or more confirmation impact iterations can be performed with increasing spacer height to observe whether or not a measurable dent is created at a different target location.

The foregoing description of process 600 contemplates a procedure where the height of the spacer(s) can be increased or decreased between impact iterations, in an attempt to change the resulting dent depth. In certain scenarios, however, there can be no measurable difference in the measured dent depth from one impact iteration to the next iteration. When that situation arises, the height of the spacer(s) can be increased slightly before performing one or more confirmation impacts. As explained in the preceding paragraph, increasing the spacer height in this manner represents a safety measure to reduce the risk of damaging the article.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for inflicting structural impact damage to an article, the system comprising:
   a main support body;
   a guide tube comprising a lower end region couplable to the main support body, and comprising a hollow interior passageway;
   an adjustable weight assembly receivable and moveable within the hollow interior passageway;
   an impact tip receivable within an opening formed in a lower end section of the main support body, the impact tip movable within the opening such that an exposed length of the impact tip protrudes outside of the main support body; and
   a travel-limiting assembly associated with the impact tip, wherein the travel-limiting assembly is adjustable to define a variable maximum penetration depth of the impact tip relative to the article.

2. The system of claim 1, wherein the adjustable weight assembly comprises a hammer tip component having an impact surface to strike an upper end of the impact tip when the adjustable weight assembly is released to fall within the guide tube.

3. The system of claim 1, wherein the adjustable weight assembly comprises a plurality of weights coupled together and combined to provide a specified drop weight.

4. The system of claim 1, wherein:
   the lower end region of the guide tube terminates at an opening;
   an upper end of the impact tip is accessible via the opening when the guide tube is coupled to the main support body; and the adjustable weight assembly strikes the upper end of the impact tip when the adjustable weight assembly is released to fall within the guide tube.

5. The system of claim 1, wherein the travel-limiting assembly is configured to define a plurality of discrete maximum penetration depths of the impact tip relative to the article.

6. The system of claim 5, wherein the travel-limiting assembly comprises a spacer having a hole formed therein to accommodate passage and translation of the impact tip during use.

7. The system of claim 5, wherein the travel-limiting assembly comprises a plurality of stackable spacers, each having a hole formed therein to accommodate passage and translation of the impact tip during use.

8. The system of claim 1, further comprising a support structure configured to hold the main support body in a fixed position relative to the article.

9. The system of claim 8, wherein the support structure is configured to hold the guide tube in a fixed position relative to the main support body.

10. The system of claim 1, wherein the adjustable weight assembly comprises a handle to facilitate lifting of the adjustable weight assembly to an initial height within the hollow interior passageway of the guide tube.

11. The system of claim 1, further comprising an offset spacer having a calibrated thickness to initialize an offset distance between a lower end surface of the main support body and the article, the offset spacer having an opening formed therein to accommodate a protruding portion of the impact tip that extends from the lower end surface of the main support body.

12. A method for inflicting structural impact damage to an article, the method comprising:
  initializing an impact damage infliction test system to obtain a target dent depth in a surface of the article, wherein the test system comprises:
    means for impacting an impact tip with a specified maximum energy; and
    means for limiting travel of the impact tip, wherein the means for limiting is adjustable to define a variable maximum penetration depth of the impact tip relative to the surface of the article, and wherein the initializing results in a first maximum penetration depth for the impact tip;
  operating the means for impacting to apply the specified maximum energy to the impact tip, using the first maximum penetration depth;
  measuring a resulting dent depth formed in the surface of the article in response to movement of the impact tip caused by operating the means for impacting;
  comparing the resulting dent depth against the target dent depth;
  adjusting the means for limiting when the resulting dent depth differs from the target dent depth by at least a specified tolerance value, wherein the adjusting changes the first maximum penetration depth to a second maximum penetration depth; and
  after adjusting the means for limiting, operating the means for impacting to apply the specified maximum energy to the impact tip, using the second maximum penetration depth.

13. The method of claim 12, further comprising:
  changing a position of the article relative to the test system, to expose an undamaged target location on the surface of the article;
  wherein operating the means for impacting, using the second maximum penetration depth, forces the impact tip against the undamaged target location.

14. The method of claim 12, wherein, when the resulting dent depth is shallower than the target dent depth, the adjusting step adjusts the means for limiting such that the second maximum penetration depth is deeper than the first maximum penetration depth.

15. The method of claim 12, wherein, when the resulting dent depth is deeper than the target dent depth, the adjusting step adjusts the means for limiting such that the second maximum penetration depth is shallower than the first maximum penetration depth.

16. The method of claim 12, wherein, when the resulting dent depth differs from the target dent depth by less than the specified tolerance value, the method further comprises:
  changing a position of the article relative to the test system, to expose an undamaged target location on the surface of the article;
  repeating operation of the means for impacting to apply the specified maximum energy to the impact tip, using the first maximum penetration depth for the impact tip, to create a confirmation dent at the target location; and
  confirming whether depth of the confirmation dent is consistent with the target dent depth.

17. The method of claim 16, wherein, when the confirming step confirms that the depth of the confirmation dent is consistent with the target dent depth, the method further comprises:
  replacing the article with a specimen article; and
  repeating operation of the means for impacting to apply the specified maximum energy to the impact tip, using the first maximum penetration depth for the impact tip, to create a dent on a surface of the specimen article.

18. The method of claim 12, wherein operating the means for impacting comprises:
  releasing an adjustable weight assembly from a calibrated height to strike the impact tip, wherein a calibrated weight of the adjustable weight assembly and the calibrated height are selected to provide the specified maximum energy.

19. The method of claim 18, wherein the initializing step comprises:
  configuring the adjustable weight assembly to obtain the calibrated weight; and
  calculating the calibrated height based on the calibrated weight.

* * * * *